Jan. 23, 1968   N. E. NELSON   3,365,157
MOUNTING ADAPTER
Original Filed April 23, 1965
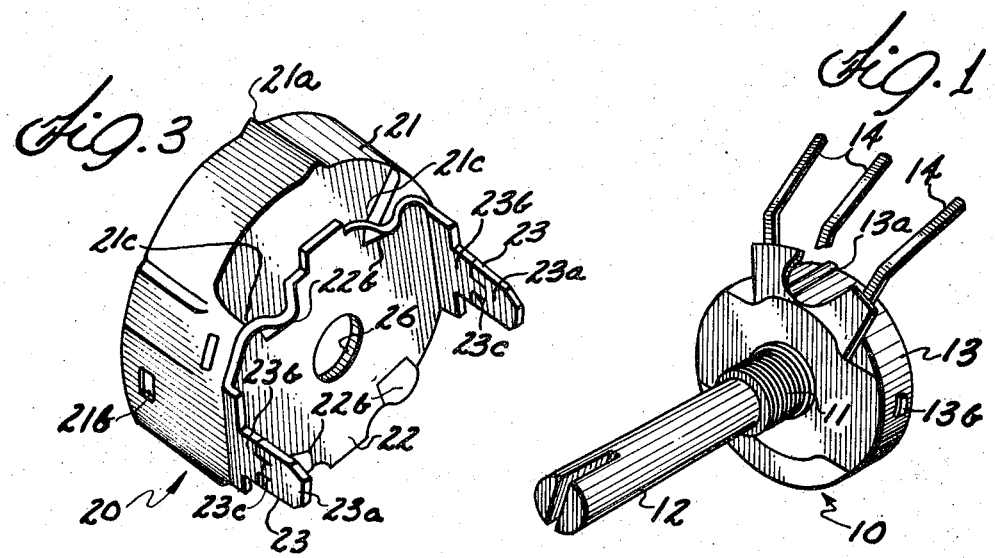
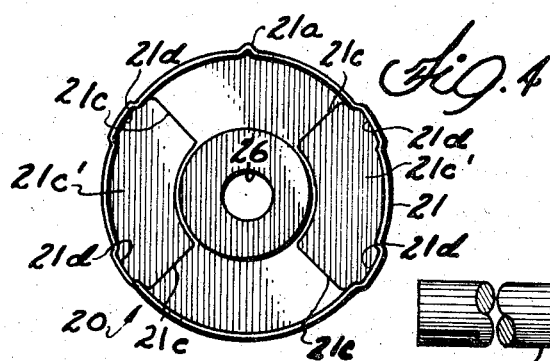
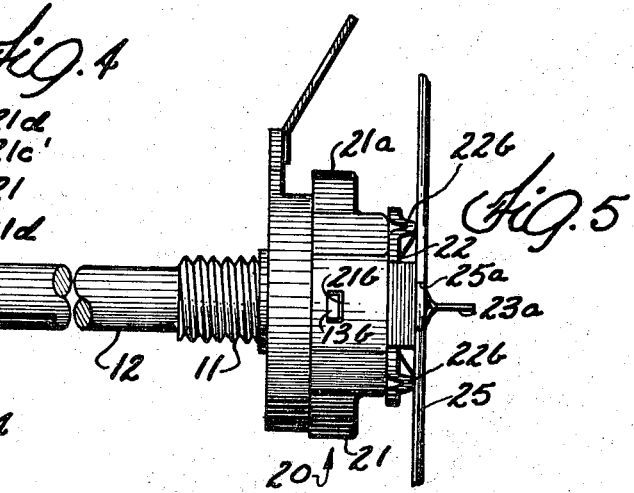
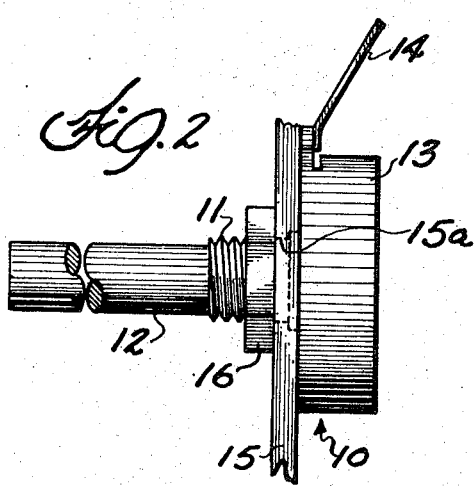
Inventor
Norman Edward Nelson
By ~ Pendleton, Neuman,
Seibold & Williams
Attorneys

United States Patent Office 3,365,157
Patented Jan. 23, 1968

3,365,157
MOUNTING ADAPTER
Norman Edward Nelson, Milwaukee, Wis., assignor to Globe-Union Inc., Milwaukee, Wis., a corporation of Delaware
Continuation of application Ser. No. 450,321, Apr. 23, 1965. This application Feb. 24, 1967, Ser. No. 618,545
13 Claims. (Cl. 248—310)

This application is a continuation of application Ser. No. 450,321, now abandoned.

The present invention relates to mounting apparatus and, more specifically, to a mounting adapter which allows for the reverse mounting of an electrical control device or the like on a panel.

It is often desirable, if not necessary, to reverse mount electrical control devices, such as variable resistors, in television sets and other electronic equipment. However, standard control devices of this type are not adapted for reverse mounting and specifically designed control devices must be used for this purpose. Consequently, it has been necessary for suppliers to stock a variety of different control devices for various requirements. It follows that it has been desirable to provide an adapter which allows for reverse mounting of standard control devices and thus increases the versatility of such devices so that only standard control devices need be stocked.

A primary object of the present invention is to provide new and improved mounting apparatus. More specifically, it is an object to provide a new and improved mounting adapter for reverse mounting of standard control devices such as variable resistors. Another object is to provide such an adapter which prevents relative movement of the control device with respect thereto.

A more specific object is to provide such an adapter which allows for varying the control device through the rear of the adapter and thus from the rear of the control device. Consequently, it is an object to provide an adapter which allows for varying the control device from the front or rear.

A general object is to provide a new and improved mounting adapter for reverse mounting of a control device characterized in its simplicity, ease in mounting, stability subsequent to mounting and economy. Another general object is to provide a new and improved mounting adapter which substantially eliminates inventory problems associated with the stocking of control devices such as variable resistors. In this connection, it is an object to provide a new and improved mounting adapter which increases the versatility of standard control devices and eliminates the need for all specifically designed control devices except for the most specialized design.

In one form of the invention, a mounting adapter is provided which includes a cup-like member adapted to receive a control device and a mounting plate attached to the cup-like member having means associated therewith for securing the plate and the cup-like housing to a panel. The adapter may include means for aligning the control device with the cup-like member and for preventing relative movement therebetween. Moreover, an aperture may be provided which extends through the plate and the cup-like member and which allows for varying the control device therethrough.

Other objects and advantages of the present invention will become apparent upon reading the attached detailed description, taken in conjunction with the drawing, wherein:

FIG. 1 is a perspective view of a typical control device;

FIG. 2 is a partial side elevational view illustrating forward mounting of the control device of FIG. 1 on a panel or wall;

FIG. 3 is a perspective view of a mounting adapter constructed in accordance with the teachings of the present invention;

FIG. 4 is an end view of the adapter in FIG. 3; and

FIG. 5 is a partial side elevational view illustrating reverse mounting of the control device of FIG. 1 on a wall or panel with use of the adapter of FIG. 3.

While the invention has been shown and will be described in some detail, with reference to a particular, exemplary embodiment thereof, there is no intention that it be limited to such detail. Quite to the contrary, it is intended here to embrace all modifications, alternatives and equivalents falling within the spirit and scope of the invention as defined by the appended claims.

Referring now to FIG. 1, an electrical control device 10, such as a variable resistor, is shown which is typical of electrical control devices used in television sets and other electronic equipment. Standard control devices of this type, as illustrated, are designed for forward mounting and are not designed for reverse mounting. The exemplary control device 10 includes a main housing 13 and a control shaft 12 which extends into the main housing. The control shaft 12 is rotatable relative to the main housing 13 to vary the operation of the control device. Projecting leads 14 are provided to allow for electrically connecting the control device 10 in a desired control circuit. Since the internal details of the control device 10 do not constitute a portion of the present invention, they will not be set forth herein.

Referring to FIG. 2, the control device 10 is shown in its conventional forward mounted position on a panel or wall 15. For the purpose of mounting the control device 10 on the wall 15, a circular aperture 15a is provided in the wall and an annular threaded control device portion 11 is provided which extends from the housing 13 coaxially with the shaft 12 and which is extended through the aperture 15a. A nut 16 is then threaded onto the threaded portion 11 to lock the control device 10 in place on the panel or wall 15.

Since, in many applications, it is desirable to reverse mount control device, it has been desirable to provide means which allow for the reverse mounting of standard control devices, such as control device 10, and thus do away with the need for specifically designed control devices for such applications. In other words, it has been desirable to provide means for increasing the versatility of standard control devices, such as control device 10. In accordance with the present invention, new and improved mounting apparatus is provided which allows for the reverse mounting of control devices, such as control device 10. More specifically, a mounting adapter 20 (see FIGS. 3 to 5) has been provided which, in the exemplary arrangement, allows for reverse mounting the control device 10 and which prevents movement of the control device relative thereto.

As may be seen, the adapter 20 includes a cup-like member 21, having an annular side wall, which is adapted to receive the main housing 13 of the control device 10. The cup-like member 21 has ribs 21c provided in the rear or bottom surface thereof which are formed by recessing or depressing the rear or bottom surface at 21c' and which increase the strength thereof. For the purpose of angularly aligning the housing 13 relative to the cup-like member 21 and further for the purpose of preventing relative rotational movement therebetween, a groove 21a is provided in the outer surface of the exemplary cup-like member which is adapted to receive a protuberance or ridge 13 on the outer surface of the housing 13. Moreover, for the purpose of also preventing relative rotational movement between the housing 13 and the cup-like member 21 and further for the purpose of normally preventing axial movement therebetween, a pair of apertures or notches 21b are provided in the sidewall of the cup-like member which are adapted to receive protuberances or pimples 13b extending outwardly from the sidewall of the housing 13. When the housing 13 is being inserted within the cup-like member 21, it will be apparent that the housing 13 and/or the member 21 will be distorted while the protuberances 13b engage the side wall of the member 21 and until they are received in the aperture 21b. Thereafter, when it is desired to remove the housing 13 from the member 21, the housing and/or the member must be distorted so that the protuberances 13b can be moved out of the apertures 21b. For this latter purpose, laterally deformed lips 21d are provided in the side wall of the cup-like member 21 and a small screw driver may be inserted in a lip 21d under the side wall to pry an aperture 21b away from a protuberance 13b so that the housing 13 may be removed from the member 21.

In order to allow for the mounting of the adapter 20 on a panel or wall 25 (FIG. 5), a mounting plate 22 is provided which is suitably secured to the cup-like member 21, such as by welding or soldering. As may be seen, the mounting plate 22 has a pair of rearwardly projecting tabs 23. In the exemplary arrangement, the tabs 23 are severed along lines 23c to provide a twistable portion 23a and a stationary portion 23b. Moreover, slots 25a are provided in the panel or wall 25 which are adapted to receive the tabs 23. Subsequent to the insertion of the tabs 23 in the slots 25a, the twistable portions 23a of the tabs may be twisted approximately 90 degrees to lock or secure the adapter 20 in place on the panel or wall, the twistable portion 23a engaging the adjacent surface of the panel or wall. The stationary portion 23b of each tab has a length which substantially corresponds to the thickness of the panel or wall 25 and extends through a slot 25a in the panel or wall when the adapter is mounted thereon. For the purpose of stabilizing the mounted adapter 20, four protuberances 22b are provided on the rear surface of the mounting plate 22 which are provided to engage the adjacent surface of the panel or wall 25, when the adapter 20 has been mounted thereon. These protuberances 22b function to prevent rocking of the adapter, i.e., function to stabilize the mounting of the adapter, and also provide a space between the adapter and the panel which allows for air movement therebetween to aid in the dissipation of heat from the control device 10 in the event that heat is produced thereby. Moreover, these protuberances 22b provide point contact with the panel or wall 25, which in most installations forms a part of a metal chassis, so that the adapter 20 is effectively grounded to the chassis.

For the purpose of allowing for adjustment of the control device 10 through the mounting plate 22 and the cup-like housing 21, a circular aperture 26 is provided which extends therethrough. Consequently, a device such as a screw driver may be extended through the aperture 26 to engage the control device 10 so that adjustment thereof may be made. It will be apparent that, for such adjustment subsequent to mounting of the adapter 20 on the wall or panel 25, corresponding apertures must be provided in the panel or wall and in the main housing 13 of the control device. Additionally, the aperture 26 allows for piggy-back mounting a second control device on the reverse mounted control device 10. Under such conditions, the control shaft 12 is removed and a new control shaft is extended through the aperture 26 to allow for adjustment of the control device 10.

In view of the foregoing, it will be apparent that a mounting adapter has been provided which allows for reverse mounting control devices, such as variable resistors, which oftentimes must be reverse mounted in television sets and other electronic equipment. Moreover, it will be apparent that a mounting device has been provided which increases the versatility of standard control devices and does away with the need of specifically designed controls for most reverse mounting applications.

What is claimed is:

1. A mounting adapter for the reverse mounting of an electrical control device or the like on a panel, which comprises a cup-like member adapted to receive the housing of the control device, a mounting plate attached to the cup-like member, and twistable tabs extending from the plate and adapted to be received in apertures in the panel, the plate and the cup-like housing being secured to the panel by twisting the tabs subsequent to receipt thereof in apertures in the panel.

2. A mounting adapter for the reverse mounting of an electrical control device or the like on a panel, which comprises a cup-like member adapted to receive the housing of the control device, and a mounting plate attached to the cup-like member and having projecting tabs adapted to be received in apertures in the panel to secure the plate of the cup-like member thereto.

3. A mounting adapter as claimed in claim 2 further including means for removably locking the housing in place within the cup-like member.

4. A mounting adapter as claimed in claim 2 further including means for preventing rotational movement of the housing within the cup-like member.

5. A mounting adapter as claimed in claim 2 wherein at least one groove is formed in the outer surface of the cup-like member, each groove being adapted to receive a protuberance on the housing to align the housing relative to the cup-like member and to prevent relative rotational movement therebetween.

6. A mounting adapter as claimed in claim 2 wherein at least one aperture is provided in the outer surface of the cup-like member, each aperture being adapted to receive a protuberance on the housing to removably lock the housing in place within the cup-like member.

7. A mounting adapter as claimed in claim 2 wherein a groove is formed in the outer surface of the cup-like member and is adapted to receive a protuberance on the housing to align the housing relative to the cup-like member and to prevent relative rotational movement therebetween, and a pair of apertures is provided in the outer surface of the cup-like member and is adapted to receive protuberances on the housing to removably lock the housing in place within the cup-like member.

8. A mounting adapter for the reverse mounting of an electrical control device or the like on a panel, which comprises a cup-like member adapted to receive the housing of the control device, a means attached to the cup-like member for securing the cup-like member to the panel and means attached to the cup-like member for maintaining a space between the cup-like member and the panel when the cup-like member is rigidly secured to the panel.

9. A mounting adapter for the reverse mounting of an electrical control device or the like on a panel, which comprises a cup-like member adapted to receive the housing of the control device, means for aligning the housing relative to the cup-like member and for preventing rotational movement therebetween, means for removably locking the housing in place within the cup-like member to normally prevent axial movement therebetween, means attached to the cup-like member for securing the cup-like member to the panel and means attached to the cup-like member for maintaining a space between the cup-like member and the panel when the cup-like member is rigidly secured to the panel.

10. A mounting adapter for the reverse mounting of an electrical control device or the like on a panel, which comprises a cup-like member adapted to receive the housing of the control device, a mounting plate attached to the cup-like member, tabs extending from the plate and adapted to be received in apertures in the panel to secure the plate and the cup-like member to the panel, and relatively rigid protuberances extending from the plate which engage the panel when the plate is secured thereto to stabilize the plate, to allow for air circulation between the plate and the panel and to provide point contact with the panel for effectively grounding the adapter to the panel.

11. A mounting adapter as claimed in claim 2 and further including an aperture extending through adjacent surfaces of the plate and the cup-like member for providing access to the control device therethrough.

12. A mounting adapter for the reverse mounting of an electrical control device or the like on a panel, comprising support means adapted to receive the housing of the control device, a plate having tabs projecting therefrom which are adapted to be received by the panel to hold said plate, said plate further including protuberances extending therefrom which are adapted to engage the panel, said support means being rigidly attached to said plate.

13. A mounting adapted as claimed in claim 12 wherein said support means includes a first member attached to said plate and means extending from said member for engaging portions of the control device whereby the control device is rigidly secured to the support means.

References Cited
UNITED STATES PATENTS

| | | | |
|---|---|---|---|
| 2,627,385 | 2/1953 | Tinnerman | 248—27 |
| 2,776,356 | 1/1957 | Kling | 338—184 |
| 2,777,924 | 1/1957 | Youngbeck | 338—134 |
| 2,874,254 | 2/1959 | Daily et al. | 174—51 |

ROY D. FRAZIER, *Primary Examiner.*

J. FRANKLIN FOSS, *Assistant Examiner.*